United States Patent
Chang (10) Patent No.: US 9,844,909 B1
(45) Date of Patent: Dec. 19, 2017

(54) IMAGE PICKUP MODULE AND THE MANUFACTURING METHOD THEREOF

(71) Applicant: Altek Semiconductor Corp., Hsinchu (TW)

(72) Inventor: Jui-Hsin Chang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 0 days.

(21) Appl. No.: 15/246,572

(22) Filed: Aug. 25, 2016

(30) Foreign Application Priority Data

Jun. 15, 2016 (TW) .............................. 105118697 A (51) Int. Cl.
| | |
|---|---|
| *H04N 13/02* | (2006.01) |
| *H01L 31/0232* | (2014.01) |
| *B29C 65/48* | (2006.01) |
| *H04N 5/225* | (2006.01) |
| *H04N 5/247* | (2006.01) |
| *B29C 35/08* | (2006.01) |
| *B29K 63/00* | (2006.01) |

(Continued)

(52) U.S. Cl.
CPC ...... *B29C 65/4845* (2013.01); *B29C 35/0805* (2013.01); *H04N 5/2252* (2013.01); *H04N 5/2254* (2013.01); *H04N 5/247* (2013.01); *B29K 2063/00* (2013.01); *B29K 2105/0061* (2013.01); *B29L 2031/34* (2013.01)

(58) Field of Classification Search
CPC ......... H01L 27/14625; H01L 2224/056; H01L 2224/05009; H04N 5/2254; C08L 25/06
See application file for complete search history.

(56) References Cited

U.S. PATENT DOCUMENTS

| 2010/0084726 | A1* | 4/2010 | Lee ................... | H01L 27/14618 |
| | | | | 257/432 |
| 2010/0091389 | A1* | 4/2010 | Henriksen ............... | G02B 3/14 |
| | | | | 359/811 |

(Continued)

FOREIGN PATENT DOCUMENTS

| CN | 204305163 | 4/2015 |
| TW | 200619809 | 6/2006 |
| TW | 201520631 | 6/2015 |

OTHER PUBLICATIONS

"Office Action of Taiwan Counterpart Application," issued on Jan. 10, 2017, p. 1-p. 8.

*Primary Examiner* — Trung Diep
(74) *Attorney, Agent, or Firm* — JCIPRNET (57) ABSTRACT

An image pickup module includes a cover, a plurality of image pickup units, a self-curing gel, and a photopolymer gel. The cover includes an upper shield, a side shield, and illumination openings and image pickup openings on the upper shield, and the upper shield and the side shield surround an accommodation space where the image pickup units are disposed. The cover at least covers a portion of upper surfaces of the image pickup units. The photopolymer gel is disposed on positions corresponding to the illumination openings that expose the photopolymer gel. The self-curing gel is disposed between the upper surfaces of the image pickup units and the upper shield. The photopolymer gel is configured to fix relative positions between the image pickup units and the cover. A manufacturing method of an image pickup module is also provided.

15 Claims, 7 Drawing Sheets

(51) Int. Cl.
  *B29K 105/00*   (2006.01)
  *B29L 31/34*   (2006.01)

(56) References Cited

U.S. PATENT DOCUMENTS

2011/0273600 A1* 11/2011 Kriman ............. H01L 27/14618
                                                          348/294
2012/0086784 A1*  4/2012 Oh ....................... H04N 5/2251
                                                          348/47

* cited by examiner

IMAGE PICKUP MODULE AND THE MANUFACTURING METHOD THEREOF

CROSS-REFERENCE TO RELATED APPLICATION

This application claims the priority benefit of Taiwan application serial no. 105118697, filed on Jun. 15, 2016. The entirety of the above-mentioned patent application is hereby incorporated by reference herein and made a part of this specification.

FIELD OF THE INVENTION

The invention relates to an image pickup module and a manufacturing method thereof. More particularly, the invention relates to an image pickup module including a plurality of image pickup units and a manufacturing method of the image pickup module.

DESCRIPTION OF RELATED ART

With the progress of science and technology, more and more electronic products are characterized by multiple functions, compact size, and high precision. In our daily lives, photo-taking functions of the electronic apparatus (e.g., an image pickup system, a handheld apparatus, or a medical investigation apparatus) are indispensable. In order to achieve favorable image quality and effects as well as provide extensive photo-taking functions, the electronic products may be equipped with an image pickup module with a plurality of image pickup units.

Nevertheless, according to the related art, in order to install the image pickup module with the image pickup units into the electronic apparatus, the image pickup units often need be assembled first. Here, the image pickup units are assembled into a fixing case to form an image pickup module, and an additional gel-filling space is required in the peripheries of the image pickup units, so as to fix the image pickup units into the fixing case through introducing adhesives into the space. In the fixing case, the accommodation space required for placing the image pickup units and the gel-filling space reserved for the adhesives lead to the unlikelihood of reducing the volume of the entire image pickup module.

SUMMARY OF THE INVENTION

The invention is directed to an image pickup module with a reduced volume.

The invention is also directed to a manufacturing method of an image pickup module which can be applied to manufacture the image pickup module with a reduced volume.

In an embodiment of the invention, an image pickup module that includes a cover, a plurality of image pickup units, a self-curing gel, and a photopolymer gel is provided. The cover includes an upper shield, a side shield connected to the upper shield, a plurality of illumination openings, and a plurality of image pickup openings. The illumination openings and the image pickup openings are formed on the upper shield, and the side shield surrounds the upper shield and form an accommodation space. The image pickup units are disposed in the accommodation space. Each of the image pickup units includes an upper surface, and the cover at least covers a portion of the upper surfaces of the image pickup units. Each of the image pickup units is configured to captures external images through one of the image pickup openings. The photopolymer gel is arranged on the upper surfaces of the image pickup units and disposed at positions corresponding to the illumination openings, and the illumination openings expose the photopolymer gel. The self-curing gel is disposed between the upper surfaces of the image pickup units and the upper shield. Each of the image pickup units is adhered to the cover through the photopolymer gel and the self-curing gel. The photopolymer gel is configured to fix relative positions between the image pickup units and the cover.

In an embodiment of the invention, a manufacturing method of an image pickup module includes: providing a cover that includes an upper shield, a plurality of illumination openings, and a plurality of image pickup opening; coating an upper surface of each of a plurality of image pickup units with an photopolymer gel and a self-curing gel, wherein the photopolymer gel is coated onto positions corresponding to the illumination openings of the cover; covering the image pickup units by the cover, wherein the upper shield of the cover covers the self-curing gel on the image pickup units, and the illumination openings expose the photopolymer gel on the image pickup units, such that the image pickup units capture external images through the image pickup openings; adjusting positions and angles of the image pickup units in the cover; curing the photopolymer gel and further fixing positions of the image pickup units before the positions of the image pickup units are fixed by the self-curing gel; curing the self-curing gel and further fixing positions the image pickup units into the cover.

According to an embodiment of the invention, a distribution area of the self-curing gel in each of the image pickup units is covered by the cover, and a space between the upper shield and the upper surface of each of the image pickup units is filled with the self-curing gel.

According to an embodiment of the invention, each of the upper surfaces of the image pickup units is rectangular, a distribution area of the photopolymer gel is adjacent to a corner of each of the upper surfaces, and a shape of the accommodation space surrounded by the cover is substantially a rectangular cube.

According to an embodiment of the invention, each of the image pickup units further includes a circuit board.

According to an embodiment of the invention, the self-curing gel is suitable for being cured at a curing temperature or a normal temperature.

According to an embodiment of the invention, the step of curing the photopolymer gel further includes irradiating the photopolymer gel by a curing light to cure the photopolymer gel.

According to an embodiment of the invention, the curing light is an ultraviolet light.

According to an embodiment of the invention, the image pickup units are connected to a circuit board.

According to an embodiment of the invention, a space between the side shield of the cover and side surfaces of the image pickup units is too small to be filled with the photopolymer gel or the self-curing gel.

In view of the above, the cover of the image pickup module provided herein is suitable for accommodating the image pickup units, and the image pickup units are fixed into the cover by the self-curing gel and the photopolymer gel. The photopolymer gel is able to fix the positions of the image pickup units before the positions of the image pickup units are fixed by the self-curing gel. As such, the image pickup units can be well affixed into the cover to form the image pickup module. By contrast, the self-curing gel can be pre-coated onto the surfaces of the image pickup units, and thus it is not required for the cover to reserve any space where the self-curing gel can be introduced. As a result, the overall volume of the image pickup module is reduced.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
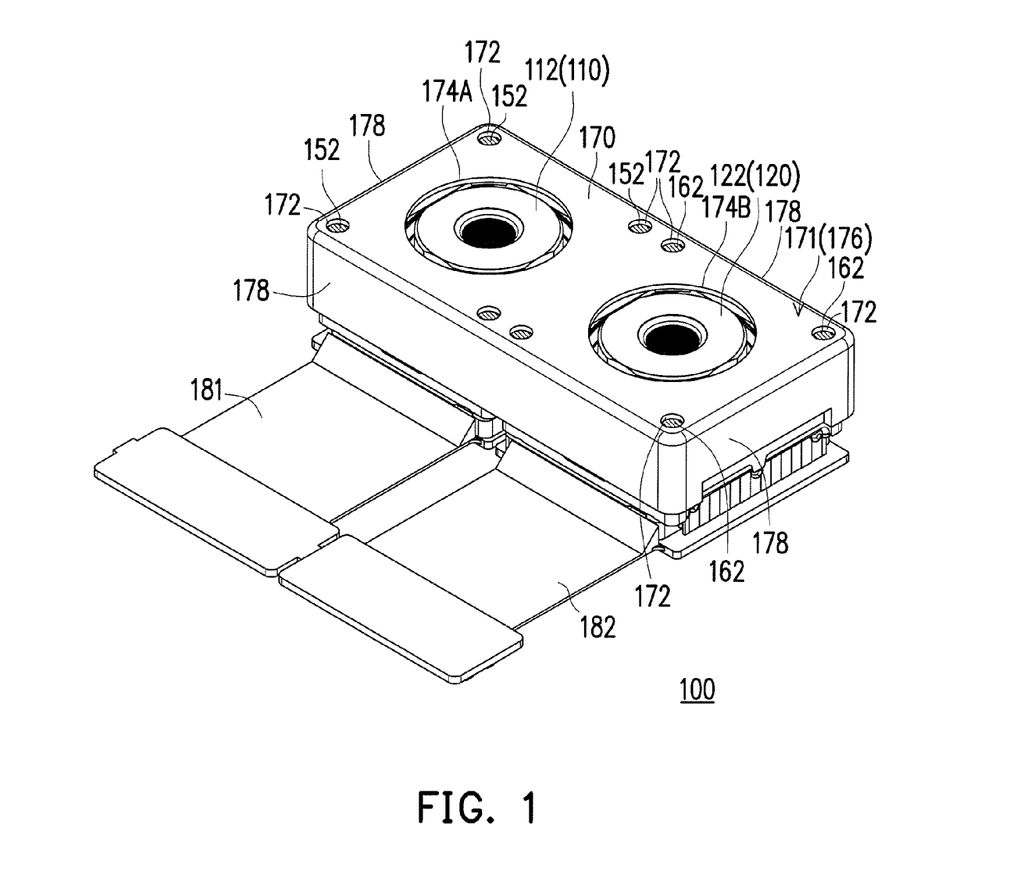
FIG. 1 is a schematic three-dimensional diagram illustrating an image pickup module according to a first embodiment of the invention.

FIG. 1 is a schematic three-dimensional diagram illustrating an image pickup module according to a first embodiment of the invention. With reference to FIG. 1, in the first embodiment of the invention, the image pickup module 100 includes an image pickup unit 110, an image pickup unit 120, and a cover 170. The cover 170 includes an upper shield 176, a side shield 178, a plurality of illumination openings 172, and image pickup openings 174A and 174B. The side shield 178 is connected to the upper shield 176, and the side shield 178 surrounds the upper shield 176 and forms an accommodation space. The image pickup units 110 and 120 are arranged in the accommodation space, and the cover 170 covers sides of the image pickup units 110 and 120 configured to capture external images. Here, the upper shield 176 covers an upper surface of the image pickup unit 110 and an upper surface of the image pickup unit 120, and the image pickup openings 174A and 174B are formed on the upper shield 176 of the cover 170. Hence, the image pickup unit 110 can capture external images through the image pickup opening 174A, and the image pickup unit 120 can capture external images through the image pickup opening 174B.

In the present embodiment, the image pickup module 100 may further include a photopolymer gel 152 and a photopolymer gel 162. The illumination openings 172 of the cover 170 are formed on the upper shield 176 of the cover 170, and the photopolymer gel 152 and the photopolymer gel 162 are arranged on the upper surfaces of the image pickup units 110 and 120 and disposed on positions corresponding to the illumination openings 172. Hence, the illumination openings 172 expose the photopolymer gel 152 and the photopolymer gel 162 on the image pickup units 110 and 120.

In the present embodiment, the image pickup module 100 may further include a self-curing gel (not shown in FIG. 1). The self-curing gel is arranged on the upper shield 176 covering a portion of the upper surfaces of the image pickup units 110 and 120; hence, the self-curing gel can, between the image pickup units 110 and 120 and the upper shield 176, adhere the image pickup units 110 and 120 to the cover 170.

In the present embodiment, the photopolymer gel 152 fixes the relative position between the image pickup unit 110 and the cover 170, and the photopolymer gel 152 fixes the relative position between the image pickup unit 120 and the cover 170. The self-curing gel adheres the cover 170 and the image pickup units 110 and 120 (which are fixed by the photopolymer gel 152 and the photopolymer gel 162) and is then cured. That is, the photopolymer gel 152 and the photopolymer gel 162 can adhere the upper surfaces of the image pickup units 110 and 120 to a portion of the upper shield 176 around the illumination openings 172; hence, before the self-curing gel is cured, the photopolymer gel 152 and the photopolymer gel 162 can fix the relative positions between the cover 170 and the image pickup units 110 and 120.

According to the present embodiment, the cover 170, the photopolymer gel 152, the photopolymer gel 162, and the self-curing gel are adopted by the image pickup module 100 to fix the image pickup units 110 and 120; therefore, the photopolymer gel 152 and the photopolymer gel 162 may temporarily fix the image pickup units 110 and 120 in the cover 170. The relative positions of the image pickup units 110 and 120 and the cover 170 are maintained by the photopolymer gel 152 and the photopolymer gel 162, and the self-curing gel is then cured to well fix the image pickup units 110 and 120 into the cover 170.

To be specific, a material of the photopolymer gel 152 and the photopolymer gel 162 includes photopolymer resin, for instance, and a material of the self-curing gel includes thermosetting resin. Hence, the photopolymer gel 152 and the photopolymer gel 162 irradiated by light beams with specific wavelength can provide the temporary fixing function before the self-curing gel is cured, which should however not be construed as a limitation to the invention. In other embodiments of the invention, the photopolymer gel and the self-curing gel can both be made of resin that which can be directly cured, and the speed of curing the photopolymer gel is faster than the speed of curing the self-curing gel. Hence, the photopolymer gel can perform the temporary fixing function before the self-curing gel is cured.

Since the photopolymer gel 152, the photopolymer gel 162, and the self-curing gel achieve favorable adhesion effects between the upper shield 176 of the cover 170 and the upper surfaces of the image pickup units 110 and 120, it is not required to provide a gel-filling space between the side shield 178 of the cover 170 and the image pickup units 110 and 120, and the overall volume of the image pickup module 100 can be reduced. Particularly, the space between the side shield 178 of the cover 170 and side surfaces of the image pickup units 110 and 120 is too small to be filled with the photopolymer gel 152 and 162 or the self-curing gel.

In the present embodiment, the image pickup unit 110 includes a circuit board 181, and the image pickup unit 120 includes a circuit board 182, such that the image pickup units 110 and 120 can be electrically connected to external devices; however, the invention is not limited thereto. In another embodiment of the invention, the image pickup units 110 and 120 can be electrically connected to the same circuit board, such that the image pickup module 100 can be electrically connected to external devices more easily.

Figure 2A:
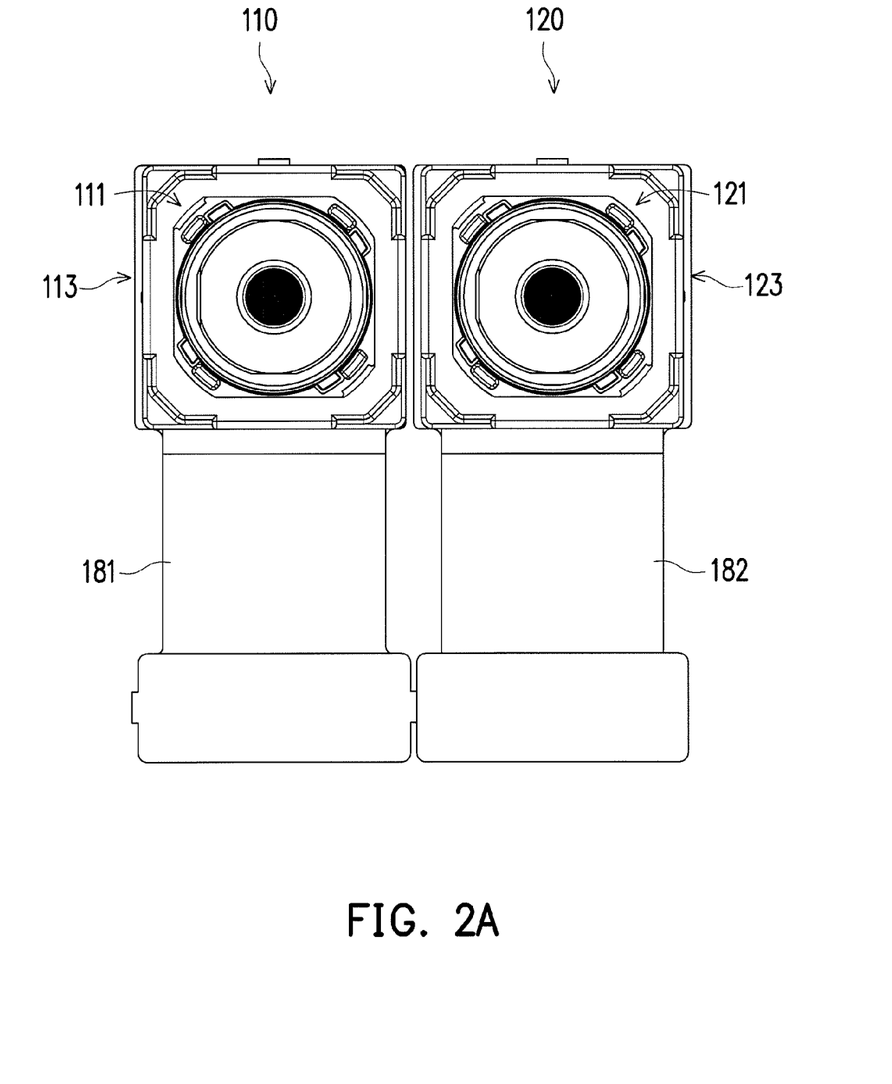
FIG. 2A to FIG. 2F are schematic diagrams illustrating each step in a manufacturing method of the image pickup module according to the first embodiment of the invention.

The manufacturing method of the image pickup module 100 and correlations among the components are explained below with reference to the attached drawings. FIG. 2A to FIG. 2F are schematic diagrams illustrating each step in a manufacturing method of the image pickup module 100 according to the first embodiment of the invention. With reference to FIG. 2A, in the manufacturing method of the image pickup module 100 provided in the first embodiment of the invention, the image pickup units 110 and 120 are provided. The image pickup units 110 and 120 are, for instance, configured to take pictures or videos along approximately the same side. Particularly, the image pickup unit 110 includes an upper surface 111 and a side surface 113 connected to the upper surface 111, the image pickup unit 120 includes an upper surface 121 and a side surface 123 connected to the upper surface 121, and the upper surface 111 of the image pickup unit 110 and the upper surface 121 of the image pickup unit 120 face approximately the same side. External image beams enter the image pickup units 110 and 120 through the upper surfaces 111 and 121.

Figure 2B:
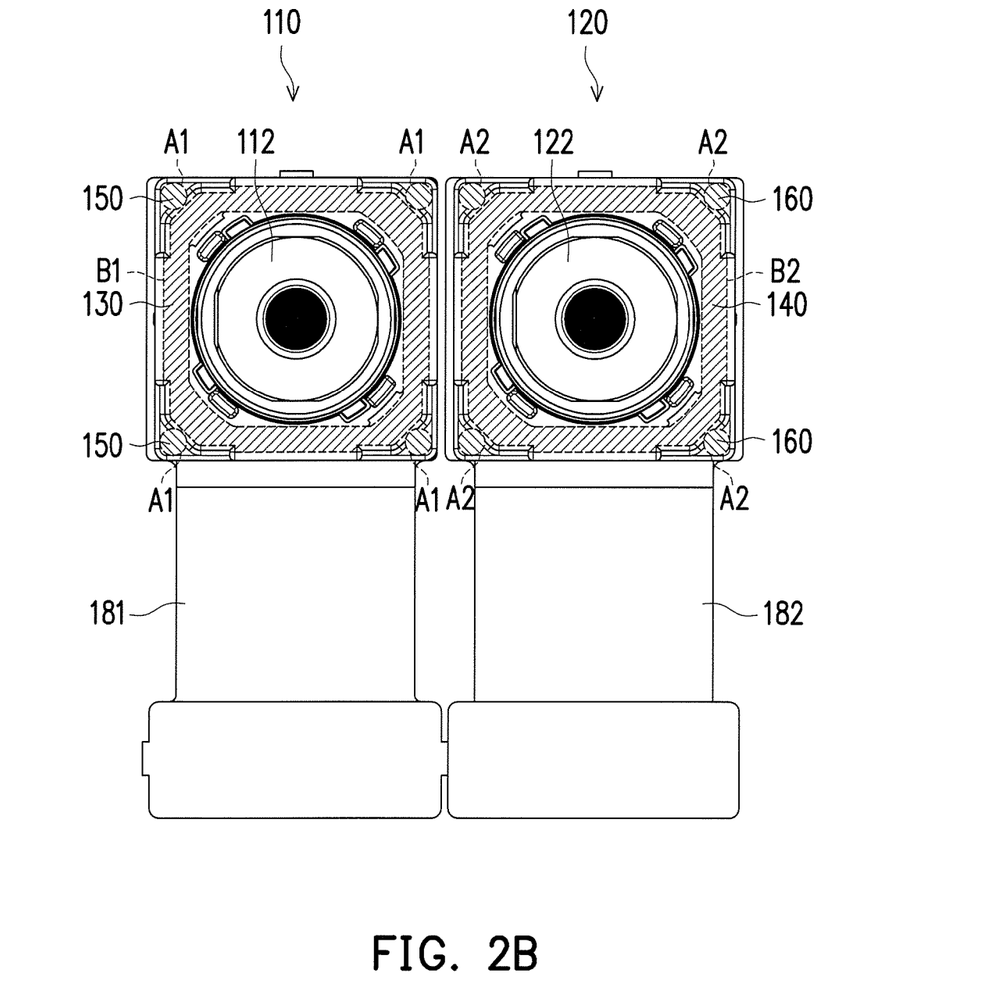

With reference to FIG. 2B, according to the manufacturing method of the image pickup module, the photopolymer gel 150 and the self-curing gel 130 are arranged on the image pickup unit 110, and the photopolymer gel 160 and the self-curing gel 140 are arranged on the image pickup unit 120. The self-curing gel 130 and the self-curing gel 140 are made of thermosetting resin, e.g., epoxy resin, and the photopolymer gel 150 and the photopolymer gel 160 are, for instance, made of an UV-cured adhesive, which should however not be construed as limitations to the invention.

Specifically, in the image pickup module 100 provided herein, the image pickup unit further includes image pickup lenses 112 and 122; in the image pickup unit 110, a distribution area B1 of the self-curing gel 130 surrounds the image pickup lens 112, and a distribution area B2 of the self-curing gel 140 surrounds the image pickup lens 122. In the image pickup units 110 and 120, a distribution area A1 of the photopolymer gel 150 is different from and smaller than the distribution area of the self-curing gel 130, and a distribution area A2 of the photopolymer gel 160 is different from and smaller than the distribution area of the self-curing gel 140.

In another aspect, as shown in FIG. 2A, the shape of the image pickup units 110 and 120 and the shape of the upper surfaces 111 and 121 are rectangular, the distribution area of the photopolymer gel 150 is adjacent to a corner of the upper surface 111 of the image pickup unit 110, the distribution area of the photopolymer gel 160 is adjacent to a corner of the upper surface 121 of the image pickup unit 120, the distribution area of the self-curing gel 130 is adjacent to the peripheries of the upper surface 111, and the distribution area of the self-curing gel 140 is adjacent to the peripheries of the upper surface 121. Hence, the photopolymer gel 150, the photopolymer gel 160, the self-curing gel 130, and the self-curing gel 140 well cover the upper surfaces 111 and 121 of the image pickup units 110 and 120.

Figure 2C:
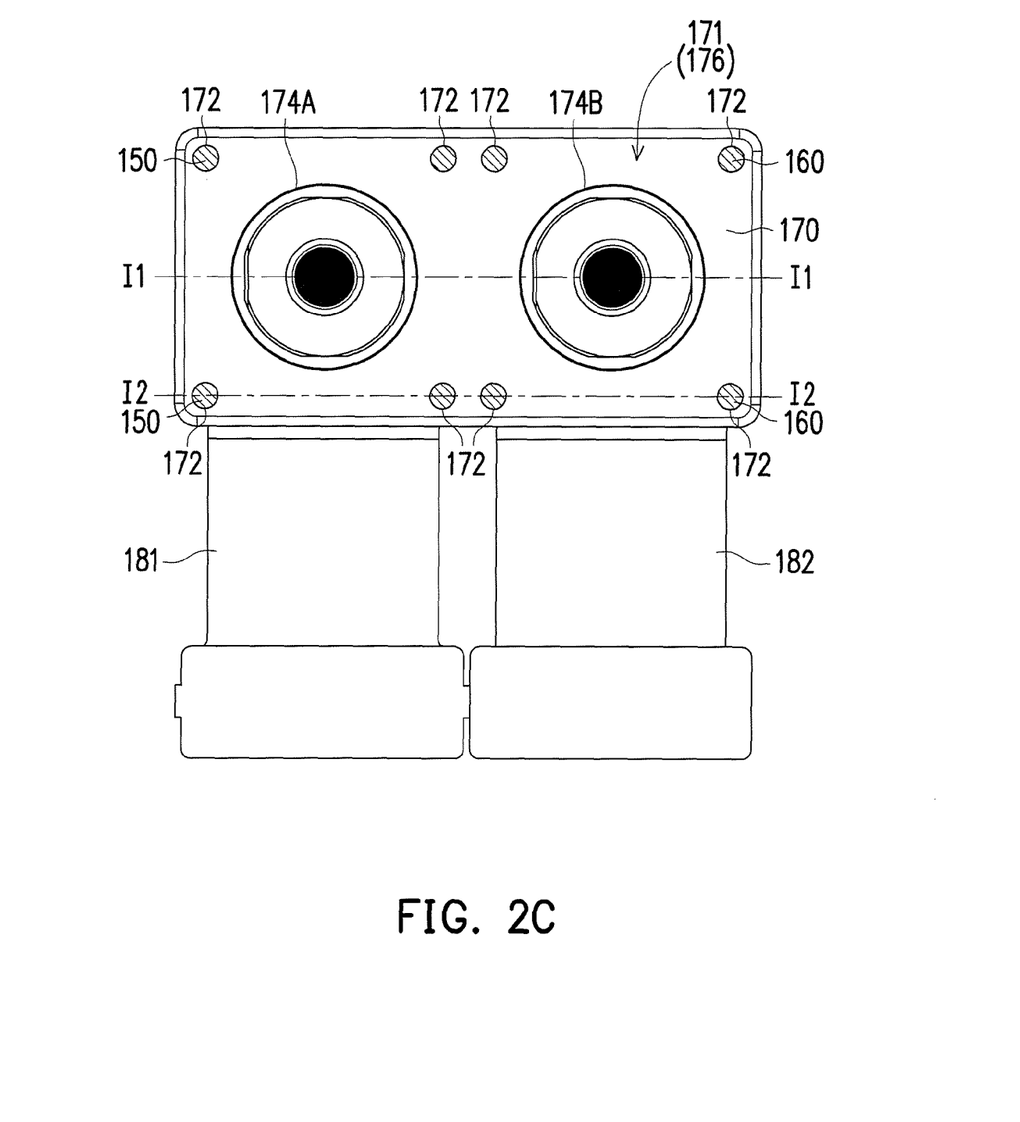

With reference to FIG. 2C, according to the manufacturing method of the image pickup module, after the self-curing gel 130, the self-curing gel 140, the photopolymer gel 150, and the photopolymer gel 160 are arranged, the image pickup units 110 and 120 are covered by the cover 170. The cover 170 covers the self-curing gel 130 on the image pickup unit 110 and the self-curing gel 140 on the image pickup unit 120. Besides, the photopolymer gel 150 on the image pickup unit 110 is exposed by the illumination opening 172 of the cover 170, the photopolymer gel 160 on the image pickup unit 120 is exposed by the illumination opening 172 of the cover 170, the image pickup unit 110 is exposed by the image pickup opening 174A, and the image pickup unit 120 is exposed by the image pickup opening 174B. That is, the cover 170 covers one portion of the upper surfaces 111 and 121 of the image pickup units 110 and 120, and the covered portion of the upper surfaces 111 and 121 of the image pickup units 110 and 120 is coated with the self-curing gel 130 and the self-curing gel 140. The cover 170 also exposes the photopolymer gel 150 and the photopolymer gel 160 on the other portion of the upper surfaces 111 and 121 of the image pickup units 110 and 120, such that the photopolymer gel 150 and the photopolymer gel 160 on the image pickup units 110 and 120 can be directly exposed to external light beams or air.

Figure 2D:
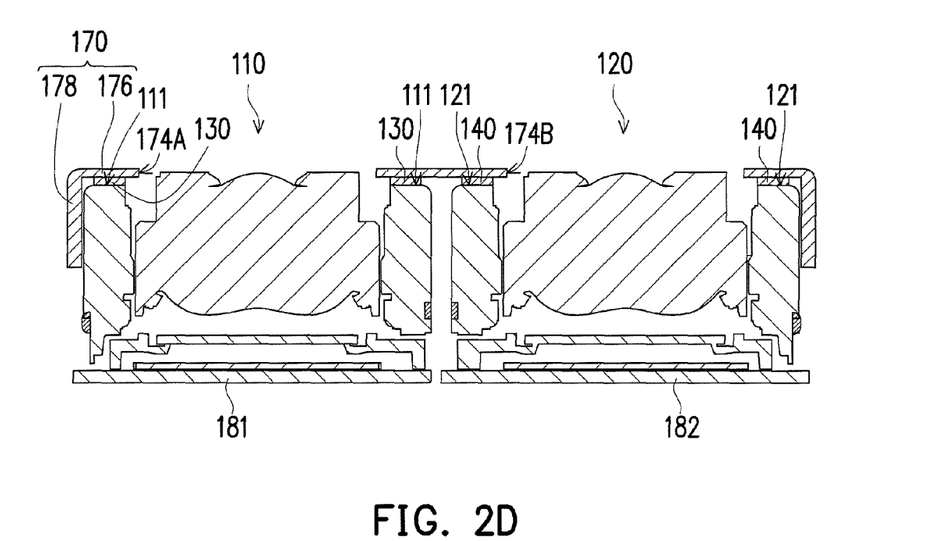

FIG. 2D is a schematic cross-sectional view taken along a section line I1I1 in FIG. 2C. To be specific, when the cover 170 provided in the present embodiment is arranged on the image pickup units 110 and 120, the distribution area of the self-curing gel 130 and the self-curing gel 140 is covered by the cover 170, such that the space between the upper shield 176 and the upper surface 111 of the image pickup unit 110 is filled with self-curing gel 130, and that the space between the upper shield 176 and the upper surface 121 of the image pickup unit 120 is filled with self-curing gel 140. A gel layer made of the self-curing gel 130 can be formed between the image pickup unit 110 and the upper shield 176, such that one portion of the surface of the image pickup unit 110 can be connected to one portion of the inner surface of the upper shield 176 through the self-curing gel 130. At the same time, a gel layer made of the self-curing gel 140 can be formed between the image pickup unit 120 and the upper shield 176, such that one portion of the surface of the image pickup unit 120 can be connected to one portion of the inner surface of the upper shield 176 through the self-curing gel 140.

Figure 2E:
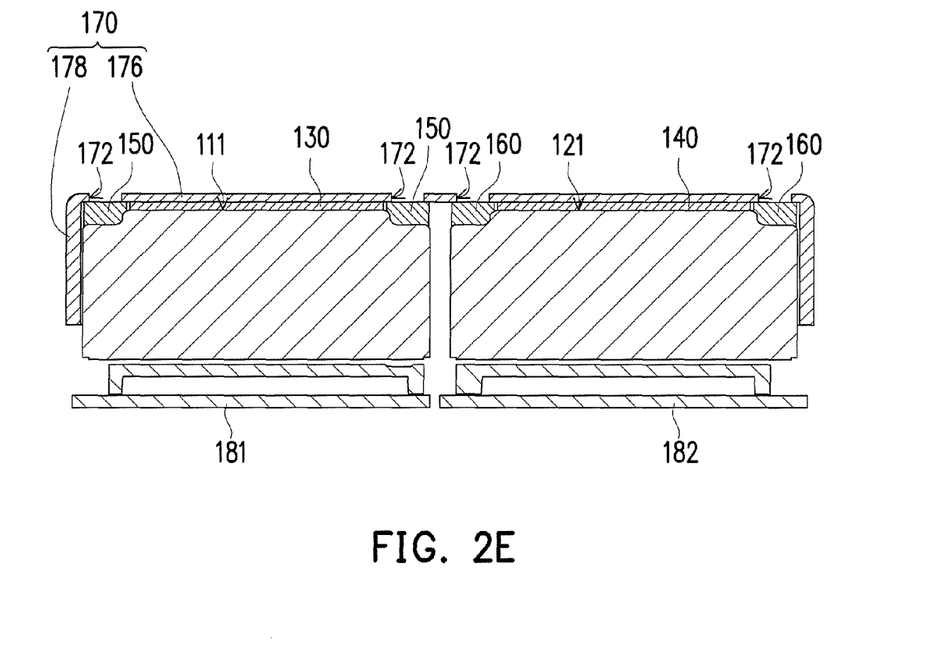

FIG. 2E is a schematic cross-sectional view taken along a section line 1212 in FIG. 2C. In particular, when the cover 170 provided herein is disposed on the image pickup units 110 and 120, a gel layer made of the photopolymer gel 150 can be formed between the image pickup unit 110 and the cover 170, such that the other portion of the surface of the image pickup unit 110 can be connected to the other portion of the inner surface of the cover 170 adjacent to the illumination opening 172 through the photopolymer gel 150. At the same time, a gel layer made of the photopolymer gel 160 can be formed between the image pickup unit 120 and the cover 170, such that the other portion of the surface of the image pickup unit 120 can be connected to the other portion of the inner surface of the cover 170 adjacent to the illumination opening 172 through the photopolymer gel 160.

As provided above, when the cover 170 covers the image pickup units 110 and 120, all of the photopolymer gel 150, the photopolymer gel 160, the self-curing gel 130, and the self-curing gel 140 are not yet cured, and therefore relative positions between the image pickup units 110 and 120 and the cover 170 can be adjusted.

In another embodiment of the invention, the relative positions and angles between the image pickup units 110 and 120 can be fixed in advance by using a fixture, and the photopolymer gel 150, the photopolymer gel 160, the self-curing gel 130, and the self-curing gel 140 are then coated onto the image pickup units 110 and 120. Therefore, when the cover 170 covers the image pickup units 110 and 120, the relative positions and angles between the image pickup units 110 and 120 can be properly maintained.

Figure 2F:
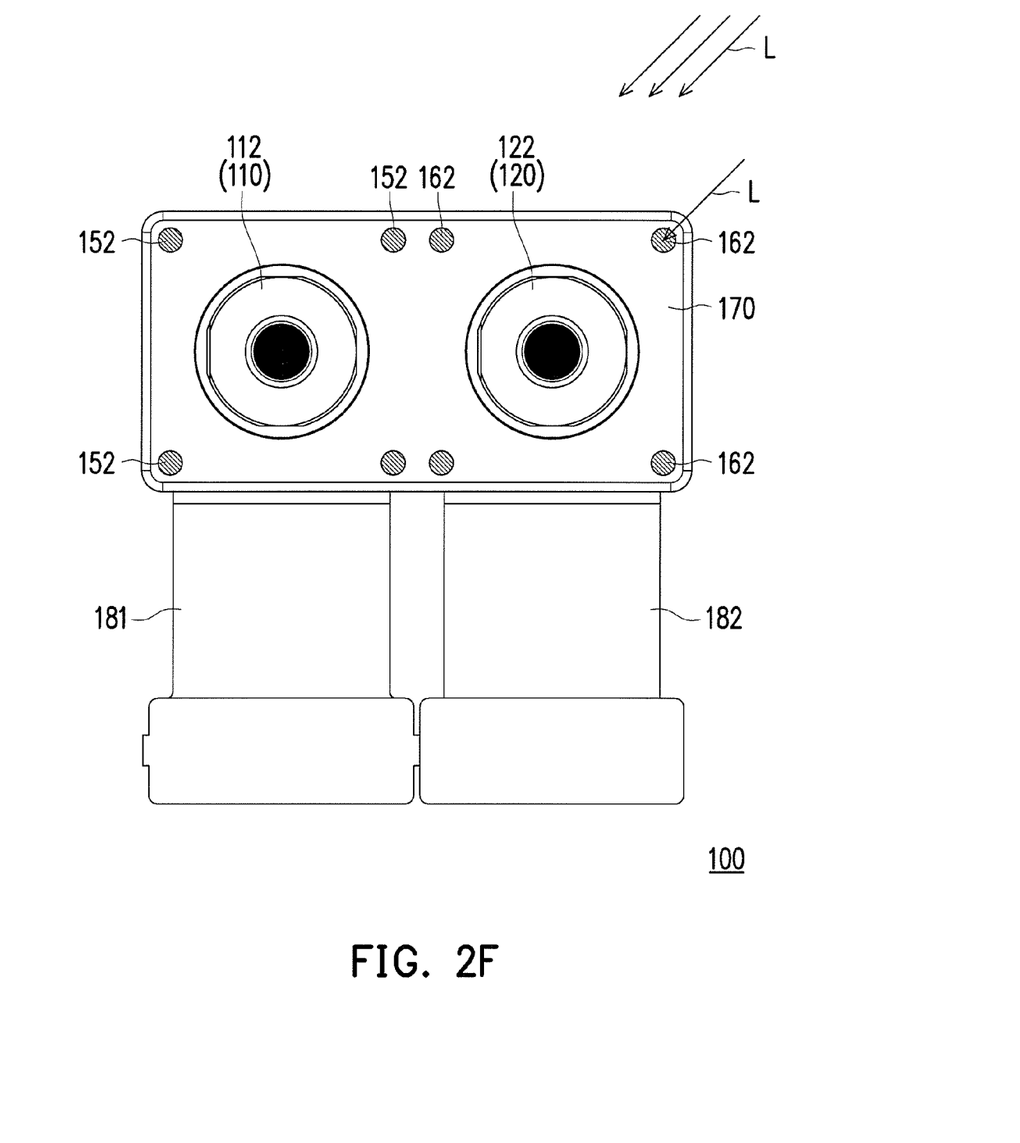

With reference to FIG. 2F, in the manufacturing method of the image pickup module provided herein, after the image pickup units 110 and 120 are arranged in the cover 170, the photopolymer gel 150 and 160 are cured to form the photopolymer gel 152 and the photopolymer gel 162, and the positions of the image pickup units 110 and 120 are fixed before the positions of the image pickup units 110 and 120 are fixed by the self-curing gel 130 and the self-curing gel 140. That is, the cured photopolymer gel 152 and the cured photopolymer gel 162 can temporarily fix the positions of the image pickup units 110 and 120 in the cover 170, and the positions of the image pickup units 110 and 120 in the cover 170 can be further adjusted through performing said step, such that the image pickup units 110 and 120 can be properly positioned in the cover 170. As a result, through applying the manufacturing method provided in the present embodiment, the image pickup module 100 with favorable performance can be formed after the self-curing gel 130 and the self-curing gel 140 are cured in the cover 170.

Particularly, in the present embodiment, a curing light L is applied to cure the photopolymer gel 150 and the photopolymer gel 160, so as to form the photopolymer gel 152 and the photopolymer gel 162. Here, the photopolymer gel 150 and the photopolymer gel 160 are UV-cured adhesives, for instance, and the curing light L is an ultraviolet light, for instance. The material of the self-curing gel 130 and the self-curing gel 140 includes thermosetting resin, e.g., epoxy resin, and the self-curing gel 130 and the self-curing gel 140 are suitable for being cured at a normal temperature or at a curing temperature higher than the normal temperature, which should however not be construed as limitations to the invention. Specifically, to complete the manufacture of the image pickup module 100, the self-curing gel 130 and the self-curing gel 140 can be fixed by performing a low-temperature baking with use of an oven.

According to the manufacturing method of the image pickup module 100 provided in the present embodiment, the self-curing gel 130, the self-curing gel 140, the photopolymer gel 150, and the photopolymer gel 160 are disposed on the image pickup units 112 and 120, and the image pickup units 112 and 120 are arranged in the cover 170. Here, the illumination openings 172 of the cover 17 expose the photopolymer gel 150 and the photopolymer gel 160. Hence, it is not necessary for the cover 170 to have any opening through which the gel is introduced or any space for the gel to flow, and thus the overall volume of the image pickup module 100 can be significantly reduced. Besides, the self-curing gel 130 and the self-curing gel 140 are coated onto the image pickup units 110 and 120 in advance; hence, the self-curing gel 130 and the self-curing gel 140 can be precisely arranged on the surfaces of the image pickup units 110 and 120 and do not overflow. Thereby, the manufacturing yield of the resultant image pickup module 100 can be improved.

In the present embodiment, the cover 170 further includes a light incident surface 171, and the illumination openings 172 penetrate the light incident surface 171. A projection area of the illumination openings 172 along a normal direction of the light incident surface 171 is located within the distribution area of the upper surfaces 111 and 121 of one of the image pickup units 110 and 120. Namely, the illumination openings 172 are configured to expose the photopolymer gel 150 and the photopolymer gel 160 on one portion of the upper surfaces of one of the image pickup units 110 and 120, such that the photopolymer gel 150 and the photopolymer gel 160 on the areas A1 and A2 can be irradiated by external light beams.

Besides, the image pickup openings 174A and 174B penetrate the light incident surface 171. The image pickup unit 110 captures an external image through the image pickup opening 174A, and the image pickup unit 120 captures an external image through the image pickup opening 174B.

Figure 3:
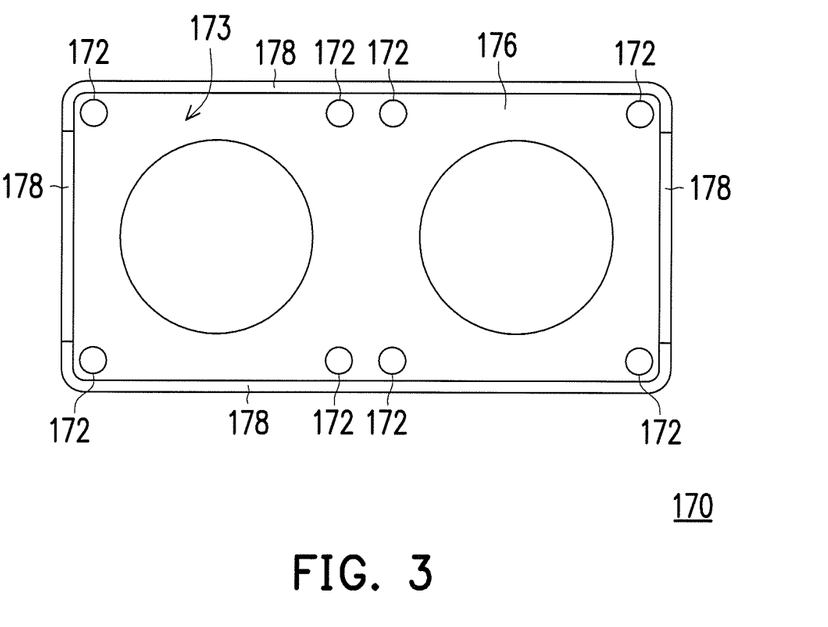
FIG. 3 is a back of a cover of an image pickup module according to the first embodiment of the invention.

FIG. 3 is a back view of a cover of an image pickup module according to the first embodiment of the invention. With reference to FIG. 2F and FIG. 3, in the present embodiment, the side shield 178 of the cover 170 is configured to surround the image pickup units 110 and 120, the illumination openings 172 are formed on the upper shield 176, and an inner surface 173 of the cover 170 is configured to connect the image pickup units 110 and 120 through the self-curing gel 130, the self-curing gel 140, the photopolymer gel 150, and the photopolymer gel 160. In other words, the side shield 178 and the upper shield 176 of the cover 170 define an accommodation space where the image pickup units 110 and 120 are located. Note that the accommodation space is surrounded by the side shield 178 and the upper shield 176. As such, the image pickup units 110 and 120 can be well fixed in the cover 170, so as to manufacture the image pickup module 100 with good quality and small volume.

With reference to FIG. 3, in the present embodiment, a shape of the accommodation space surrounded by the cover 170 is substantially a rectangular cub, and the volume of the accommodation space approximates to the total volume of the image pickup units 110 and 120; hence, the volume of the image pickup module 100 can be significantly reduced. To be specific, the material of the cover 170 provided herein includes plastic, for instance; however, the invention is not limited thereto. In other embodiments of the invention, the material of the cover may further include metal or non-metal.

To sum up, the cover of the image pickup module provided herein is suitable for accommodating the image pickup units, and the cover expose the photopolymer gel on the image pickup units; hence, the image pickup units can be temporarily fixed into the cover by the photopolymer gel, and the photopolymer gel is able to fix the positions of the image pickup units before the positions of the image pickup units are fixed by the self-curing gel. In addition, the area where the photopolymer gel and the self-curing gel are coated is not limited by the size of the openings of the cover, and therefore the image units can be well affixed into the cover to form the image pickup module. In addition, according to the manufacturing method of the image pickup module provided herein, the self-curing gel can be pre-coated onto the surfaces of the image pickup units, and thus it is not required for the cover to reserve any space for introducing the self-curing gel and allowing the self-curing gel to flow. As a result, the overall volume of the image pickup module is reduced.

Although the disclosure has been provided with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An image pickup module comprising:
   a cover comprising an upper shield, a side shield connected to the upper shield, a plurality of illumination openings, and a plurality of image pickup openings, the illumination openings and the image pickup openings being formed on the upper shield, the side shield surrounds the upper shield and forms an accommodation space;
   a plurality of image pickup units disposed in the accommodation space, wherein each of the image pickup units comprising an upper surface, and the cover at least covering a portion of the upper surfaces of the image pickup units, and each of the image pickup units is configured to capture image through one of the image pickup openings;
   a photopolymer gel arranged on the upper surfaces of the image pickup units and disposed at positions corresponding to the illumination openings, the illumination openings exposing the photopolymer gel; and a self-curing gel at least disposed between the upper surfaces of the image pickup units and the upper shield, wherein each of the image pickup units is adhered to the cover through the photopolymer gel and the self-curing gel, and the photopolymer gel is configured to fix corresponding positions of the image pickup units and the cover.

2. The image pickup module as recited in claim 1, wherein a distribution area of the self-curing gel in each of the image pickup units is covered by the cover, and a space between the upper shield and the upper surface of each of the image pickup units is filled with the self-curing gel.

3. The image pickup module as recited in claim 1, wherein each of the upper surfaces of the image pickup units is rectangular, a distribution area of the photopolymer gel is adjacent to a corner of each of the upper surfaces, and a shape of the accommodation space surrounded by the cover is substantially a rectangular cube.

4. The image pickup module as recited in claim 1, wherein each of the image pickup units further comprises a circuit board.

5. The image pickup module as recited in claim 1, wherein the image pickup units are connected to a circuit board.

6. The image pickup module as recited in claim 5, wherein a space between the side shield of the cover and side surfaces of the image pickup units prevent the photopolymer gel and the self-curing gel from flowing in.

7. The image pickup module as recited in claim 1, wherein a material of the cover comprises metal or non-metal.

8. The image pickup module as recited in claim 1, wherein a material of the cover comprises plastic.

9. A manufacturing method of an image pickup module, comprising:

providing a cover, wherein the cover comprising an upper shield, a plurality of illumination openings, and a plurality of image pickup openings;

coating an upper surface of each of a plurality of image pickup units with a photopolymer gel and a self-curing gel, wherein the photopolymer gel is coated onto positions corresponding to the illumination openings of the cover;

covering the image pickup units by the cover, the upper shield of the cover covering the self-curing gel on the image pickup units, wherein the illumination openings expose the photopolymer gel on the image pickup units, such that the image pickup units capture external images through the image pickup openings;

adjusting positions and angles of the image pickup units in the cover;

curing the photopolymer gel and further fixing positions of the image pickup units before the positions of the image pickup units are fixed by the self-curing gel; and curing the self-curing gel and further fixing positions the image pickup units into the cover.

10. The manufacturing method of the image pickup module as recited in claim 9, wherein when the image pickup units are covered by the cover, the cover covers a distribution area of the self-curing gel in each of the image pickup units.

11. The manufacturing method of the image pickup module as recited in claim 9, wherein the step of providing the image pickup units, the photopolymer gel, and the self-curing gel further comprises arranging the photopolymer gel adjacent to a corner of the upper surface of each of the image pickup units and arranging the self-curing gel in peripheries of the upper surface of each of the image pickup units.

12. The manufacturing method of the image pickup module as recited in claim 9, wherein the self-curing gel is suitable for being cured at a curing temperature or a normal temperature.

13. The manufacturing method of the image pickup module as recited in claim 9, wherein the step of curing the photopolymer gel further comprises irradiating the photopolymer gel by a curing light to cure the photopolymer gel.

14. The manufacturing method of image pickup module as recited in claim 13, wherein the curing light is an ultraviolet light.

15. The manufacturing method of the image pickup module as recited in claim 9, wherein a material of the self-curing gel comprises thermosetting resin.

\* \* \* \* \*